United States Patent
Sutphin

(10) Patent No.: US 8,044,839 B2
(45) Date of Patent: Oct. 25, 2011

(54) COMBINED RADAR AND COMMUNICATIONS LINK

(75) Inventor: Eldon M. Sutphin, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 186 days.

(21) Appl. No.: 12/637,179

(22) Filed: Dec. 14, 2009

(65) Prior Publication Data

US 2011/0148688 A1 Jun. 23, 2011

Related U.S. Application Data

(63) Continuation-in-part of application No. 10/585,882, filed on Jul. 11, 2006, now Pat. No. 7,633,426.

(51) Int. Cl.
*G01S 13/62* (2006.01)

(52) U.S. Cl. ............... 342/22; 342/28; 342/57; 342/58; 342/114; 340/541; 340/554

(58) Field of Classification Search ........... 342/22, 342/27, 28, 57, 58, 114; 340/541, 554
See application file for complete search history.

(56) References Cited

U.S. PATENT DOCUMENTS

| | | |
|---|---|---|
| 4,288,049 A | 9/1981 | Alpers |
| 4,347,618 A | 8/1982 | Kavouras et al. |
| 5,357,255 A | 10/1994 | Giraudy |
| 5,673,050 A * | 9/1997 | Moussally et al. ............. 342/22 |
| 6,232,910 B1 | 5/2001 | Bell et al. |
| 6,313,782 B1 * | 11/2001 | Lehan et al. .................. 342/16 |
| 6,380,833 B1 | 4/2002 | Nguyen et al. |
| 6,400,308 B1 | 6/2002 | Bell et al. |
| 6,633,254 B1 | 10/2003 | Sutphin |
| 7,161,527 B2 * | 1/2007 | Vacanti ......................... 342/121 |
| 7,298,313 B1 * | 11/2007 | Fiden et al. .................... 342/57 |
| 7,355,545 B2 * | 4/2008 | Zemany et al. ................ 342/22 |
| 7,576,688 B2 | 8/2009 | Lehtinen |
| 7,633,426 B2 * | 12/2009 | Sutphin .......................... 342/22 |
| 2005/0062605 A1 | 3/2005 | Sutphin |
| 2008/0074307 A1 | 3/2008 | Boric-Lubecke et al. |
| 2009/0135044 A1 | 5/2009 | Sutphin |
| 2009/0201190 A1 | 8/2009 | Huthoefer et al. |
| 2009/0212943 A1 | 8/2009 | Burnard et al. |
| 2011/0148688 A1 * | 6/2011 | Sutphin .......................... 342/28 |

* cited by examiner

*Primary Examiner* — John B Sotomayor
(74) *Attorney, Agent, or Firm* — Robert K. Tendler; Daniel J. Long

(57) ABSTRACT

In a CW radar system for detecting motion behind a wall involving modulation of the radar transmission, means are provided to interrupt the CW wave when motion is detected and to use the same radar transmitter to transmit a serial digital message to a remote monitoring receiver. The encoding can include a receiver wakeup message to turn on the receiver only when motion has been detected. In one embodiment, a microprocessor is used to detect when motion exists behind a wall and to provide a tailorable message to modulate the radar's transmitter in the period when the CW signal from the radar is turned off after motion detection.

8 Claims, 3 Drawing Sheets

COMBINED RADAR AND COMMUNICATIONS LINK

RELATED APPLICATIONS

This is a continuation application of U.S. application Ser. No. 10/585,882 filed Sep. 14, 2004 (now U.S. Pat. No. 7,633,426 issued Dec. 15, 2009), PCT/US04/30117 filed Sep. 14, 2004 and U.S. Provisional Ser. No. 60/538,011 filed Jan. 20, 2004 (now expired), incorporated herein by reference.

STATEMENT OF GOVERNMENT INTEREST

The invention described herein was made under Contract No. N39998-97-C-5216 with the Government of the United States of America and may be manufactured and used by and for the Government of the United States of America for Governmental purposes without the payment of any royalties thereon or therefor.

FIELD OF THE INVENTION

This invention relates to small, relatively low-powered radar systems and more particularly to the provision of a remote display of radar results.

BACKGROUND OF THE INVENTION

As described in U.S. Pat. No. 6,633,254 issued to Eldon Sutphin, assigned to the assignee hereof and incorporated herein by reference, in the past, low-powered radar systems have been employed for use in intrusion alarms, vehicle sensing, surveillance and through-wall detection.

In one application, a CW radar is utilized to project energy through a wall and into a room where it is returned by moving objects such as an individual. The reflected energy from the moving object is indicated by a phase variation between the incident radiation and the reflected radiation such that, by measuring the phase difference of signals transmitted by the antenna and signals received by the same antenna, one can detect the presence of an individual in a room.

Systems employing such radars can also be adapted to provide an indication of not only the existence of a moving individual, but also the range of the individual to the particular radar involved. Moreover, such CW radars can be used with antennas at differing positions to be able to more accurately locate an individual and, for instance, to discriminate between individuals who move and stationary articles within a room.

The ability of small lightweight radars to penetrate walls is useful, for instance, in detecting individuals in a burning building or to conduct surveillance on individuals, both for police work and for military purposes.

In such applications, it is oftentimes necessary to have the individual manning the radar equipment to be removed from the radar itself for a number of reasons. One reason is that heat or other radiation from a building may be such as to preclude the presence of an individual manning the radar at the site.

Secondly, it may be desirable to have the individual manning the radar removed from the site due to, for instance, hostile actions taken when the individual is at the building. Also, covert operations require that the individual manning the radar be remote from the sensing location so as to remain undetected. Also, for motion detection-type radars, having an individual adjacent the radar may result in false alarms due to the individual being in the back lobe of the radar antenna. In such a case the radar may detect the movement of the individual manning the radar as opposed to movement of an individual within a building or within the main lobe of the radar beam.

For intrusion alarms, vehicle sensing and other surveillance applications, it is thus important to have an unmanned radar and to be able to monitor the results of the radar surveillance at a central location removed from the point at which the radar measurements are taken. Thus, for instance, if one wants to use multiple radars to surveille a given area, it is important to be able to have the radars communicate with a central location so that the individual radars need not be manned. Additionally, when radars are moved by robotic systems to be able to accurately pinpoint individuals within a building, oftentimes it is a requirement that the individual control the robot from a distance. This being the case, the radar returns must be displayed and/or analyzed at some distant point.

The aforementioned patent performs the communications functions but does so by continuously projecting the CW wave. The remote signaling is accomplished by modulating the frequency of the continuous wave. The result is that remote receivers used to monitor the radar returns must remain on continuously. This results in unnecessary power drain for these battery-powered receivers. Moreover, receivers oftentimes receive garbled transmissions if more than one radar is used, for instance, to improve on range measurements or to triangulate on a moving individual. Thus in the past there was no convenient way to separate out signals from multiple radars, much less specifically code returns from a given radar, either to address only a particular receiver or to provide a serial digital message.

Also, when attempting to monitor movement, it would be convenient if the multiple radars could communicate on a single communication channel. Since the radars would normally be operating on different frequencies or channels, it would be advantageous to be able to switch these radars to a single frequency for communications.

There is therefore a need to be able to address different remote receivers, like pagers, and to be able to convey information about detected movement without having to use a separate transmitter at the radar.

SUMMARY OF INVENTION

In order to provide requisite communication between the radar and the monitoring receiver, the CW wave from the radar is interrupted by a microprocessor when a valid indication of a moving individual has occurred. Note that the interruption only occurs after motion has been detected and the CW signal is no longer useful.

After the CW signal interruption the radar's transmitter is modulated by a serial data message, which may include the address of a particular receiver. The message may include a so-called wake up code so that the receiver need not be in full receive mode all the time. Such operation is akin to a pager, which in this case would be paged when motion is detected. After paging, a digital bit stream may be sent for conveying information about the radar returns. Thus a remote receiver can be turned on only when motion has been detected and can be separately addressed.

In one embodiment of the subject invention the radar's frequency source is modulated with a serial digital message in accordance with data reflecting returned radar signals, with the digital message permitting specialized tailoring of the information to be transmitted.

While in the above-mentioned patent the information was transmitted by frequency modulation of the continuous wave, in the subject invention amplitude modulation or pulse code modulation is permitted during the period that the CW wave is interrupted.

The result is that with the use of a microprocessor the digitally modulated radar signal serves as a highly tailorable communications link to remote monitoring apparatus in which the remote receiver need only be actuated when a digital actuation signal is transmitted.

Moreover, when multiple radars are used, for instance, to obtain better range accuracy, then all of the individual radars can be switched to communicate over a separate communication channel. This is done by changing the frequency of the radars after motion has been detected. Changing the radar frequency also gives flexibility to permit transmission to receivers tuned to different frequencies. Thus, the radars can be tuned to different frequencies so that only a receiver tuned to a particular frequency will be addressed by a particular radar.

Note that, as before, the radar antenna serves two purposes, the first being to form a radar beam and the second being to function as a communications antenna in which the radar signal is modulated.

Thus, rather than providing a completely different transmitter and antenna to provide a communications link, in the subject invention the interruption of the normal CW signal upon motion detection permits the transmission of a digital message by the same antenna that is used by the radar to form a radar beam. Thus the radar signal is not only directed from this antenna towards an area from which returns are expected, but it is also used to report the presence of motion to a remote location. The distance at which modulated signals from the radar can be detected varies from 20 feet to as much as a mile or two so that an individual manning the radar need not be at the site of the radar. This protects the individual from hostile engagement at the radar site and also permits a degree of covertness, since the only thing that needs to be placed at the surveilled area is a small, nondescript unmanned device.

In summary, in a CW radar system for detecting motion behind a wall involving modulation of the radar transmission, means are provided to interrupt the CW wave when motion is detected and to use the same radar transmitter to transmit a serial digital message to a remote monitoring receiver. The encoding can include a receiver wakeup message to turn on the receiver only when motion has been detected. In one embodiment, a microprocessor is used to detect when motion exists behind a wall and to provide a tailorable message to modulate the radar's transmitter in the period when the CW signal from the radar is turned off after motion detection.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
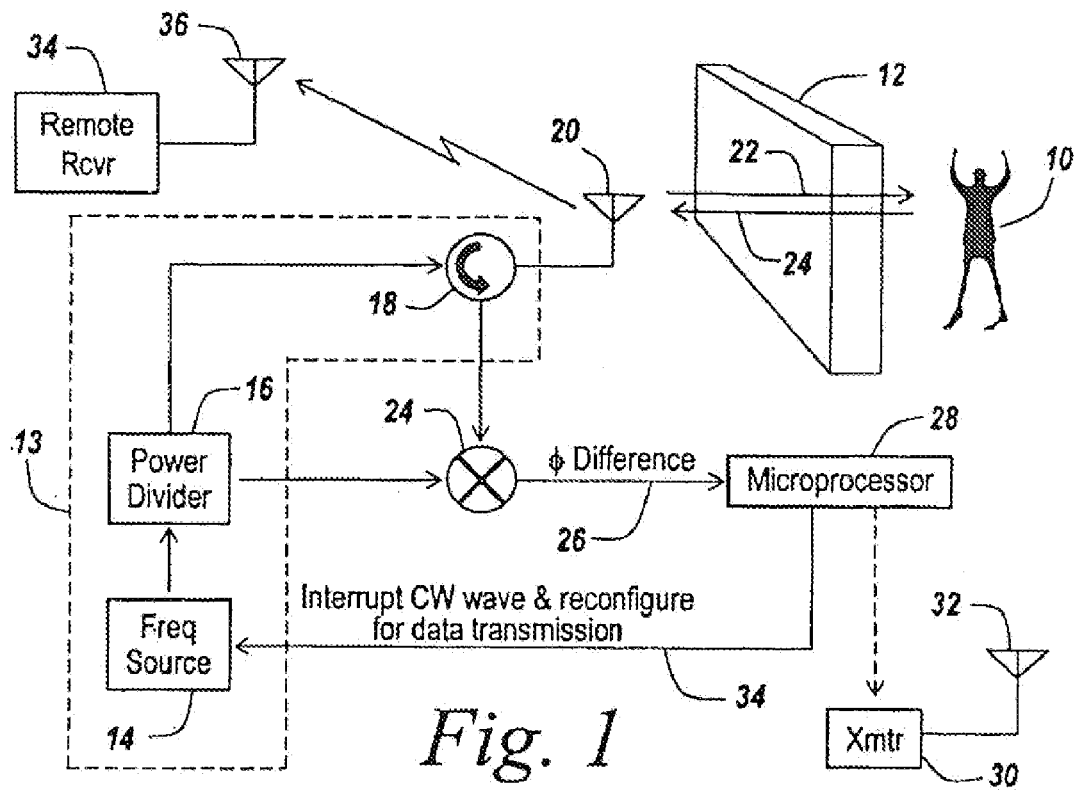
FIG. 1 is a diagrammatic illustration of the use of a CW radar to detect motion of an individual behind a wall in which motion is detected by a microprocessor as a change in the phase difference between the transmitted and the returned signals, with the motion detection occurrence being transmitted to a remote site after motion is detected, the microprocessor generating a corresponding serial data message.

Referring now to FIG. 1, if it is important to detect the presence of an individual 10 behind a wall 12, then in one embodiment of the subject invention, a CW radar is used. This radar includes a transmitter 13 including a frequency source 14, a power divider 16 and a circulator 18 to drive a radar antenna 20.

The CW signal from antenna 20, here indicated by arrow 22, is projected through wall 12 towards individual 10, with returns 24 impinging on antenna 20. The return is then coupled via circulator 18 to a mixer 25.

The output of mixer 24 is indicated by arrow 26 to be the phase difference between the transmitted and returned signals. This signal is applied to a microprocessor 28 containing an analog-to-digital converter that functions in one aspect as a motion detector, the output of which indicates a moving object behind wall 12.

If one wished to remotely monitor of the motion detector output, one might provide a separate transmitter 30 and its own antenna 32.

However, to do so is not the most efficient way to provide a communications link to a remote location.

In order to do so, one uses microprocessor 28 to encode the fact that motion has been detected. Secondly, microprocessor 28 inhibits the production of the CW wave after motion has been detected by controlling frequency source 14. Thirdly, microprocessor 28 generates a serial digital data message to be used in modulating the signal from transmitter 13. Transmitter control signals are coupled over line 34 from microprocessor 28 to transmitter 13 to interrupt the CW signal and to modulate the transmitter with the serial digital data message.

The result of modulating transmitter 13 is a signal broadcast by antenna 20 to a remote location at which a receiver 34 and its antenna 36 are located. It will be appreciated that the radar's transmitter can be reconfigured after interruption of the CW wave, with the reconfigured transmitter modulating the output of the type of radar for purposes of remote monitoring. Any modulation of the radar signal, be it frequency modulation, phase modulation, amplitude modulation, pulse code modulation or the like, is within the scope of the subject invention.

Figure 2:
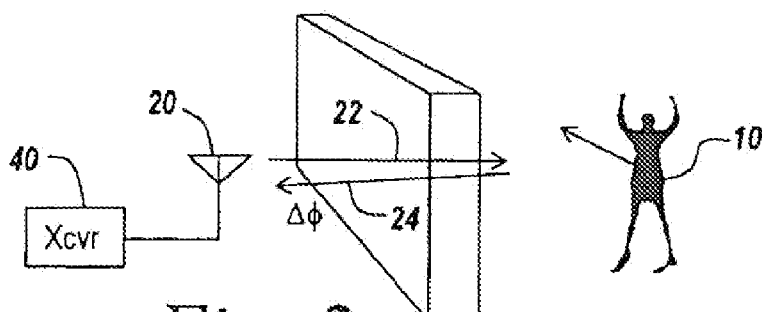
FIG. 2 is a diagrammatic illustration of the phase difference of a signal that is the result of motion of an individual behind a wall.

By way of background and referring to FIG. 2, in order to detect motion of individual 10, there is a phase difference between the transmitted signal 22 and the returned signal 24, which difference is detectable at transceiver 40 that includes all of the elements of FIG. 1.

Figure 3:
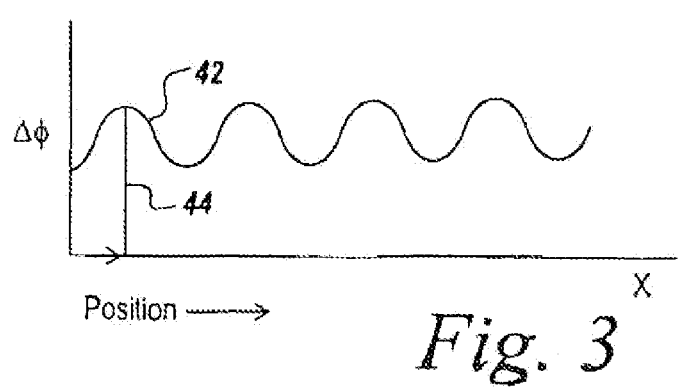
FIG. 3 is a graph showing the phase difference between the transmitted and returned signals due to, for instance, constant motion of an individual.

Referring to FIG. 3, if individual 10 is moving at a constant velocity, then the phase difference 42 will vary as indicated and will result in the ability to detect the range 44 of the individual from the antenna.

Figure 4:
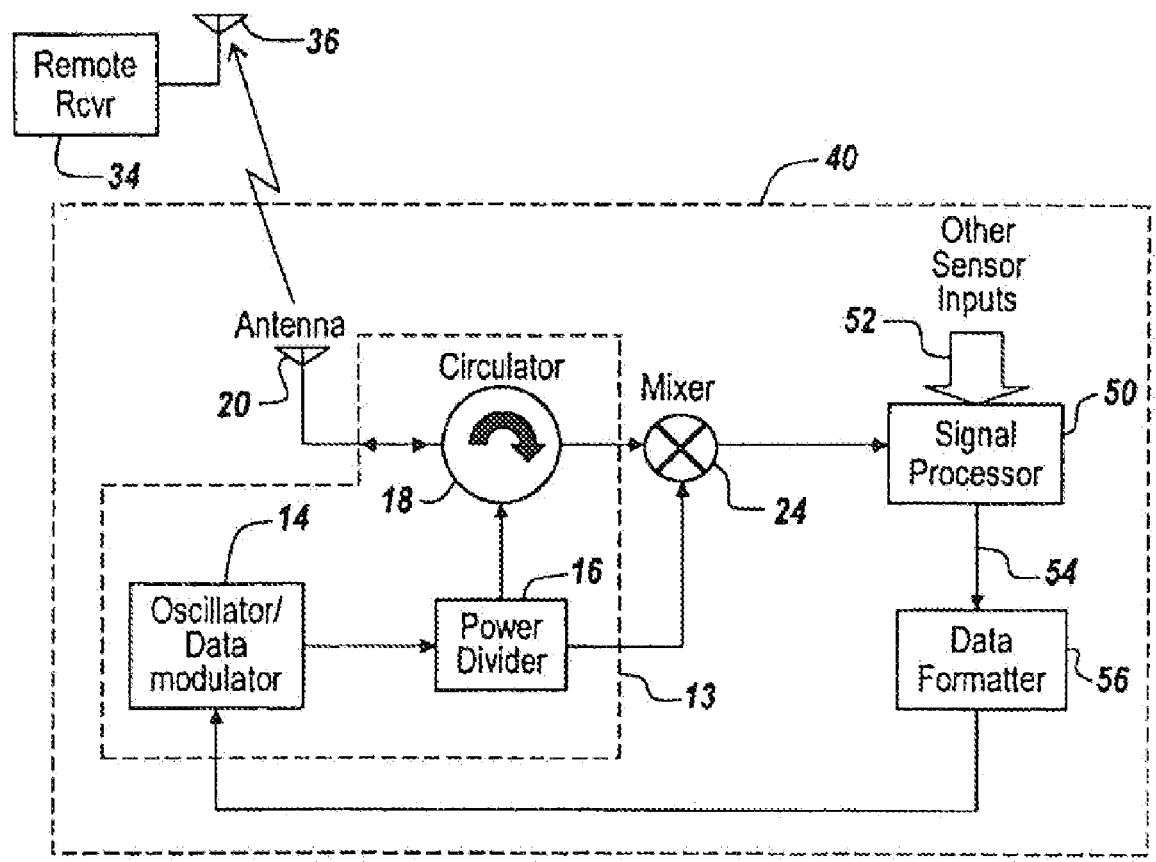
FIG. 4 is a block diagram of a CW radar that uses a microprocessor to analyze the results of returned radiation, formats the data, interrupts the CW radar source and transmits the formatted data using the same transmitter used to generate the radar beam.

Referring now to FIG. 4, the radar transceiver 40 is shown having antenna 20 connected to transmitter 13 that includes frequency source 14, power divider, 16 and circulator 18. An output of circulator 18 is coupled to mixer 25, with the input to antenna 20 being from power divider 16, which is supplied by a frequency source 14, in this case an oscillator. The oscillator can include a modulator for modulating the output thereof. Thus frequency source 14 can be considered to include an oscillator and data modulator. The amplitude of the oscillator output, the frequency of the oscillator, or the phase of the signal from the oscillator can be modulated to provide flexibility for the communications channel. In any case, it is this frequency source that encodes the radar transmission to provide the communications link.

Note that the output of mixer 25 is coupled to a signal processor 50 in the form of a microprocessor which, in addition to detecting motion, may have other sensor inputs 52.

All of the inputs to the signal processor result in an output of data on line 54, which is coupled to a data formatter 56 and thence to frequency source 14. Note that data formatter 56 may be part of the microprocessor.

What will be appreciated is that the same device that is performing the radar function also provides a communications link function, with the oscillator and antenna doing double duty to set the frequency of the radar and also to provide for a communications link consisting of a modulated radar signal.

In operation, when motion is detected, signal processor 50 causes the CW wave to be interrupted by shutting down frequency source 14, which serves as an oscillator/data modulator. In one embodiment transmitter 13 is reconfigured for a number of purposes. For instance, transmitter 13 can be driven to transmit a wake up code so as to place one or more remote receivers in a full receive mode. Note that this code can be used to address only selected receivers. Thereafter any data that needs to be transmitted is transmitted to one or more remote locations using the same radar transmitter that was used to produce the CW wave.

Signal processor 50 can also be used to change the frequency of the radar transmitter either to a single communications channel, or to a pre-selected frequency used to address a pre-selected remote receiver.

In one embodiment, the system described can be characterized as a remote Doppler radar motion sensor that can detect and report motion data to a user at a distance from the radar unit. Other applications include intrusion alarm systems sensing personnel behind walls, vehicle sensors, portable alarms and the like. Using the same RF source for both radar and remote data transmission provides an economical remote radar unit. Additionally, for systems using other remote sensors where the data is transmitted via an RF link, the addition of but a few components provides communication of data from the scene to a remote location.

Note that the modulation can be either amplitude modulation, frequency modulation, pulse code modulation or phase modulation and can either be analog or digital depending on the application.

In the above embodiment, normally the unit has no reason to transmit data when operating in the radar mode. When motion is detected the same transmitter used in the radar mode has its CW signal interrupted, with its transmitter then reconfigured to provide either a short burst of digital data or a signal to alert or notify the user.

Note that an analog alert can use audio or digitized voice to indicate the amount of motion via the subject radio link.

Note also that the frequency source modulator can also be tuned to a different common reporting frequency for data transmission when multiple sensors are used. Moreover, in addition to the processed data signal being sent to a user, the message could also contain an identifier to alert the user of the particular sensor being used.

Thus, it will be appreciated that what is provided is a smaller, relatively low-powered radar system that is adaptable for use in intrusion alarm, vehicle sensing, surveillance and through-wall detection devices in which the output of such devices is reported to individuals who are remote from the location at which the sensing is done.

Figure 5:
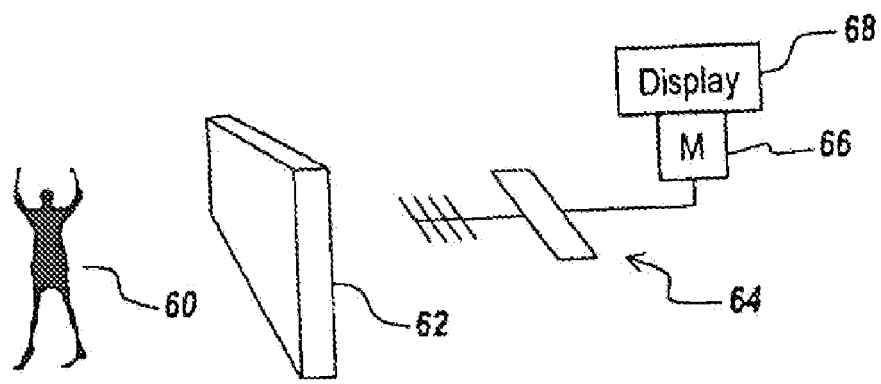
FIG. 5 is a diagrammatic illustration of a prior art through-the-wall monitoring system in which an individual manning the monitor is at the monitoring site; and, FIG. 6 is a diagrammatic illustration of the use of an unmanned radar, in one embodiment carried by a robot, which uses the same radar antenna that projects energy through a wall and transmits a modulated radar signal to a remote location.

Referring now to FIG. 5, as can be seen, in the past, an individual 60 has his or her existence detected behind wall 62 by a radar 64 in which motion is detected at 66 and is displayed at 68 to an individual manning the radar.

Figure 6:
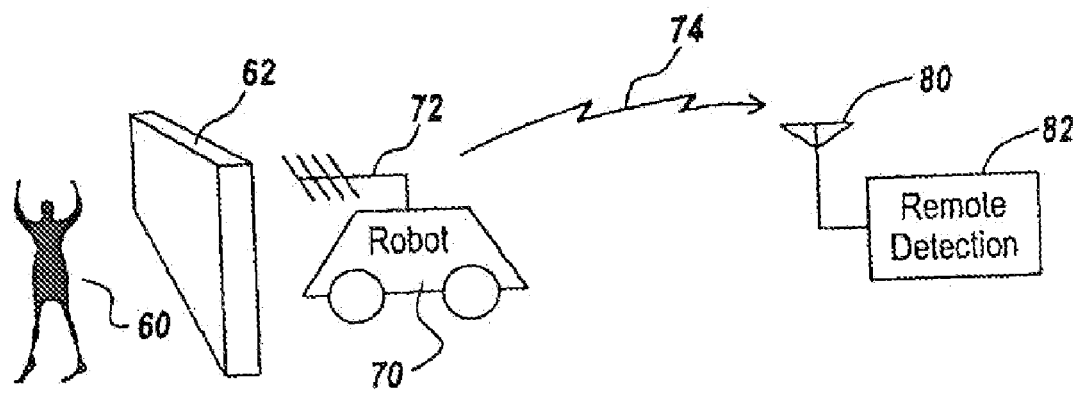

Referring to FIG. 6, in accordance with the subject invention, individual 60 has his or her existence sensed by a robot 70 having a radar antenna 72 that projects energy through wall 62 in order to detect the motion of individual 60. At the same time, a signal 74 from antenna 72 that has been modulated in accordance with the subject invention, is detected by an antenna 80 of a remote receiver 82, thus to provide remote detection of the radar results.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A combined radar and communications link, comprising:
   a radar having a frequency source and an antenna for forming a radar beam;
   a unit at said radar for monitoring radar returns and for developing a signal reflecting a radar parameter;
   means for interrupting the normal radar beam when the particular parameter has been detected;
   a modulator coupled to said frequency source and said signal reflecting a radar parameter for modulating the signal transmitted by said radar antenna after normal beam interruption in accordance with said parameter, whereby modulated radiation from said radar antenna establishes said communications link; and
   wherein said radar is a CW radar and wherein said modulation is selected from the group consisting of amplitude modulation, frequency modulation, phase modulation and pulse code modulation.

2. The combined radar and communications link of claim 1, wherein said parameter is associated with motion of an object in the beam of said radar and further including alerting means when the signal transmitted by said radar antenna is modulated.

3. The combined radar and communications link of claim 2, wherein said alerting means includes an audible signal generator.

4. The combined radar and communications link of claim 2, wherein said alerting means includes a display.

5. The combined radar and communications link of claim 4, wherein said display includes a visual representation of the position of the object relative to said radar.

6. The combined radar and communications link of claim 5, wherein said visual representation includes a plot of the position of said object.

7. The combined radar and communications link of claim 1, wherein said radar is a CW radar.

8. The combined radar and communications link of claim 7, wherein said parameter includes the motion of an object in the beam of said radar, and further including a detector for detecting the phase difference between the transmitted radar beam and the radar returns, said phase difference indicating the presence of a moving object in said radar beam.

* * * * *